Dec. 13, 1955  J. W. DODSON  2,726,839
FUEL CONTROL VALVE
Filed Oct. 10, 1951
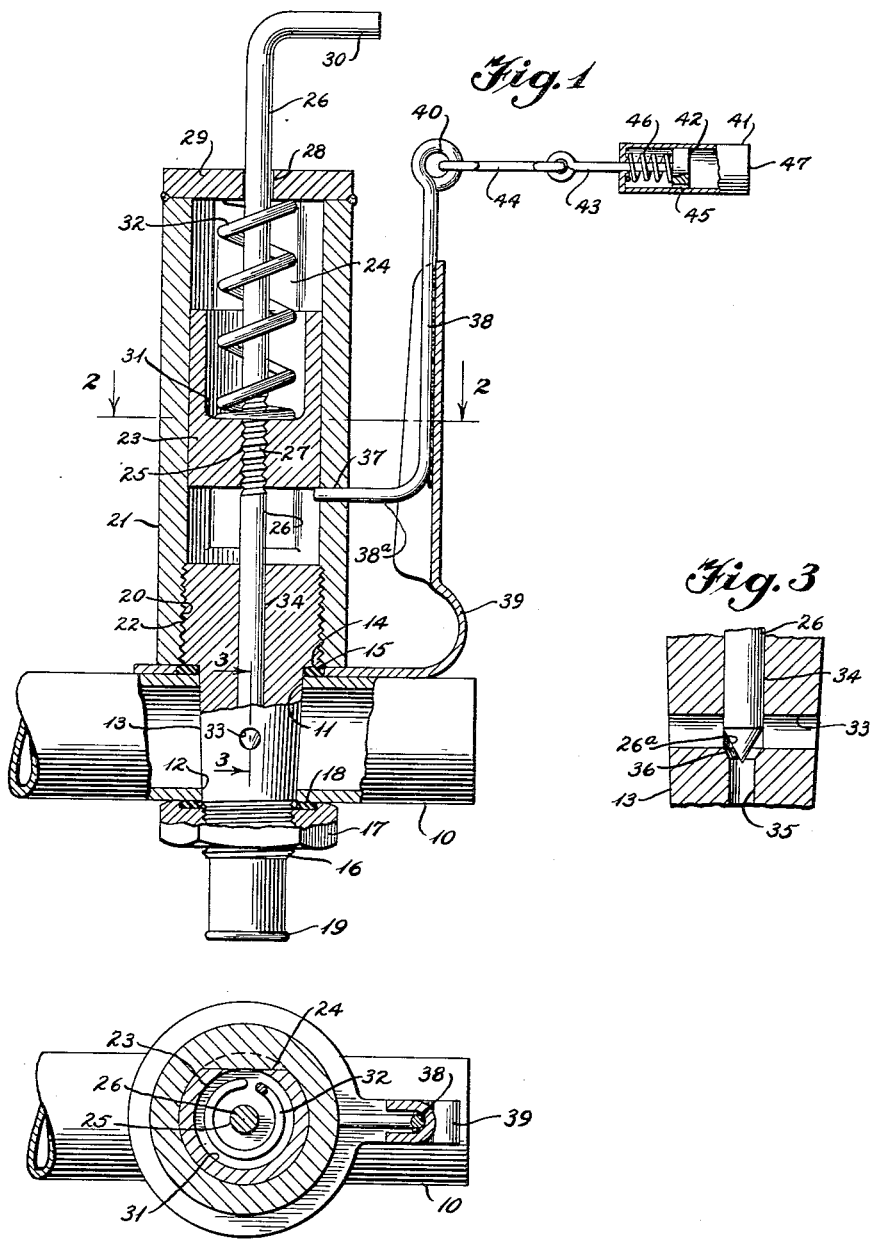
Inventor
Joe W. Dodson
By Walter S. Pawl
Attorney

2,726,839

FUEL CONTROL VALVE

Joe W. Dodson, Elizabeth City County, Va.

Application October 10, 1951, Serial No. 250,775

1 Claim. (Cl. 251—49)

(Granted under Title 35, U. S. Code (1952), sec. 266)

The present invention relates to fuel metering valves and more particularly to a valve adapted to be used in compression-ignition, two-cycle engines of the type found on model airplanes, boats and the like.

The compression-ignition engine is a comparatively recent innovation in model aircraft development. The fuel-air ratio is ordinarily governed by a conventional needle valve. By this method the needle valve regulates the amount of air flowing therethrough to mix with the fuel supply. In providing a means for cutting off the engine many of the prior art devices provide, in addition, a cut-off valve in the fuel supply line. However, a disadvantage of such an arrangement is the added weight of the cut-off valve. Often, weight is a decisive factor in model aircraft performance and the increased burden on the aircraft of carrying the added valve decreases its efficiency. Other prior art devices stop the engine by reducing the air intake area, thereby flooding the crankcase with fuel. This is most undesirable inasmuch as these small engines are quite difficult to start after having been flooded. Therefore in all cases it is necessary to have one valve for cut-off and the needle valve for carburetion.

The present invention overcomes the difficulties above-mentioned and has as one of its objects the provision of a combined fuel metering and cut-off valve, the arrangement being such that a needle valve controls the fuel-air ratio during flight and after a pre-determined period of time shuts off the flow of fuel, thereby stopping the engine. A quick termination of the running of the engine is important in view of the twenty second limitation placed on engine run in free flight by the Academy of Model Aeronautics.

Another object of the invention is to furnish a valve of the type aforementioned in which the needle can be adjusted to any desired position of fuel-air mixture for running of the engine, without any effect on the cut-off characteristic of the needle.

A further object of the invention is to adjustably mount the needle valve in a plunger, the latter being slidably mounted in a sleeve or housing with means thereon for preventing rotation of the plunger, the metering end of the needle extending through a guideway and into the opening through which the fuel supply enters.

A still further object of the present invention is to furnish a spring to resiliently urge the plunger into a position where the needle cuts off the fuel flow, and latch means for maintaining the needle in its running adjustment for a pre-determined period of time, at the termination of which the latch is released permitting the spring to urge the valve into a closed position.

Still other objects and advantages of the invention will be apparent from the following detailed description taken with the accompanying drawing, wherein:

Fig. 1 is a cross-sectional view of the invention showing the latch in its operative position;

Fig. 2 is a view taken on lines 2—2 of Fig. 1;

Fig. 3 is a view taken on lines 3—3 of Fig. 1.

Similar reference characters represent similar parts throughout the several views.

In Fig. 1 there is shown a tubular air intake pipe 10 having therein a pair of aligned apertures 11 and 12, the latter aperture being slightly smaller in diameter than the former. A fuel supply plug 13 is adapted to extend through both these apertures until shoulder 14 near one end of the plug is seated against tube 10. A sealing washer 15, as shown in Fig. 1, is provided to adapt the shoulder to the tube outer surface. The outer surface of plug 13, intermediate the ends thereof, is tapered to conform with apertures 11 and 12. To secure the plug in position there is provided a threaded portion 16 which receives a nut 17. A sealing washer 18, similar to washer 15, is furnished to adapt nut 17 to the surface of tube 10. The lower end of the plug has a peripheral bead 19 thereon which is adapted to receive the hose connection from the fuel supply tank (not shown).

Plug 13 is threaded, as at 20, from shoulder 14 to the end of the plug adjacent thereto. A sleeve 21 has internal threads 22 at one end thereof adapted to threadingly engage threads 20 on the plug end. A plunger 23 is slidably mounted in said cylinder, said plunger having a generally cylindrical surface with a segment thereof removed to form a flat keyway, illustrated by the numeral 24. The interior surface of sleeve 21 is shaped in a manner to conform with the plunger surface, thus permitting sliding movement of the plunger therein but preventing rotation.

A threaded aperture 25 is fashioned centrally in said plunger. This aperture is adapted to receive the valve element, as needle valve 26, the latter having a threaded portion 27 threadingly received by the aperture. One end of the needle extends through an aperture 28 provided in a cap 29. A handle 30 is found on the end of the needle valve to permit threading adjustment thereof in plunger 23. Plunger 23 has a seat 31 in the upper portion thereof which is adapted to receive one end of a coil spring 32, the other end of said spring abutting cap 29. Thus it will be seen that spring 32 normally urges plunger 23 toward the upper end of plug 13.

The regulation of the fuel supply to the engine is provided by the end of the needle valve which extends into plug 13. The plug has a transverse bore, illustrated by the numeral 33, located centrally of the tube between apertures 11 and 12. This bore acts as a nozzle to supply the fuel to the air chamber inside tube 10. The end portion of the needle valve extends through a longitudinal bore 34 in the plug to a point adjacent bore 33. A somewhat smaller bore 35 is formed in the lower portion of plug 13 in alignment with bore 34. The upper end of bore 35, adjacent bore 33, is chamfered as at 36 to provide a seat for the tapered end 26a of the needle valve.

Fuel is adapted to enter bore 35 from the supply tank and is metered through the space between chamfer 36 and the tapered end 26a of the needle valve. The fuel then leaves through both ends of aperture 33 where it is mixed with the air passing through tube 10 and vaporized. The annular space between the tapered end of the needle valve and seat 36 determines the amount of fuel flow into the engine.

It will be apparent that spring 32 would tend to cut off the flow of fuel entirely. For this reason I provide a latch or stop mechanism for permitting fuel to flow for a predetermined period of time before allowing spring 32 to urge the needle valve into a position to cut off the fuel supply.

To carry out this operation there is provided an aperture 37 in the wall of cylinder 21, said aperture being adapted to slidably receive one end 38a of an L-shaped latch member 38. When piston 23 is positioned above aperture 37 end 38a extends into the interior of the cylinder and prevents closing of the needle valve. A leaf spring 39 is secured to pipe 10 by cylinder 21 and has a vertical portion to which is attached the vertical portion of latch 38. An eye 40 is fashioned at the upper end thereof to receive a line or other control means for swinging the latch outwardly away from the cylinder so as to remove end 38a from beneath piston 23, thus permitting seating of the tapered end of the needle valve on chamfer 36.

The timing adjustment may be of any conventional type which will provide a desired predetermined period of time before actuating lever 38. The particular mechanism which I show includes a cylinder 41 having a piston 42 slidably mounted therein. A piston rod 43 is secured at one end to piston 42 and at the other end to line 44, the latter being connected to eye 40 of latch 38. A coil spring 46 is mounted around rod 43 inside the cylinder and urges piston 42 toward cylinder end 47. An aperture of appropriate diameter, illustrated by numeral 45, is provided in the piston to control the rate of movement of the piston as the spring urges it towards the aforementioned cylinder end.

The operation of the valve is such that end 38a of the latch is positioned and manually held in aperture 37 with the tip of said end projecting into sleeve 21 beneath plunger 23. The needle valve is adjusted by handle 30 until a desired running condition of the engine is obtained. When the timing period is begun piston rod 43 is pulled outwardly from the cylinder compressing spring 46. When it is released the spring urges it toward end 47 with aperture 45 controlling the speed of travel. Line 44 is of such length that by the time piston 42 reaches cylinder end 47 latch end 38a is removed from beneath plunger 23. Spring 32 urges the piston downwardly seating the needle valve and cutting off the fuel supply. Thus the engine is stopped.

From the above it will be seen that a time controlled valve has been provided which acts during normal operation to properly meter the flow of fuel to be mixed with air, and which, upon the termination of a predetermined period of time, automatically stops the engine by cutting off the fuel supply. Thus, there is no danger of flooding the crankcase of the engine. The parts are simple to assemble and can be easily manufactured. The material necessary may be very light since a great deal of strength is not required. By combining the needle valve with an automatic time adjustment, one valve is made to serve two purposes.

Obviously, many modifications and variations of the present invention are possible in the light of the above teachings. It is, therefore, to be understood, that within the scope of the appended claim, the invention may be practiced otherwise than as specifically described.

The invention described herein may be manufactured and used by or for the Government of the United States of America for governmental purposes without the payment of any royalties thereon or therefor.

What is claimed is:

A fluid metering and cut off device comprising a valve element and seat therefor, a slidable support, means mounting said valve element in said support for manual adjustment to preset or regulate the valve element with respect to said seat so that the rate of fluid flow may be selected, a coil spring reacting on said slidable support constantly urging said valve element toward a seated position on said seat whereby said valve element is spring closed, a stop movable into the path of travel of said support at which location said valve element is held separated from said seat an amount corresponding to the adjustment of said valve element with respect to said support, a leaf spring supporting said stop and normally biasing said stop into the path of said support, and time-delay means connected to said stop for moving said stop out of the path of travel of said support against the bias of said leaf spring whereby said valve element and said support are released suddenly after a measured interval and quickly moved as a unit by said coil spring to seat said valve element.

References Cited in the file of this patent

UNITED STATES PATENTS

| | | |
|---|---|---|
| 588,357 | Rowe | Aug. 17, 1897 |
| 769,521 | Walter | Sept. 6, 1904 |
| 900,260 | Boyd | Oct. 6, 1908 |
| 902,096 | Love | Oct. 27, 1908 |
| 956,595 | McKee | May 3, 1910 |
| 966,672 | Ellison | Aug. 9, 1910 |
| 1,632,144 | Nemic | June 14, 1927 |
| 1,644,714 | Eisenhauer | Oct. 11, 1927 |
| 1,776,738 | Mitchell | Sept. 23, 1930 |
| 2,091,228 | Hann | Aug. 24, 1937 |
| 2,120,248 | Hinchman | June 14, 1938 |
| 2,396,809 | Addison | Mar. 19, 1946 |
| 2,551,445 | Lindsay | May 1, 1951 |